(12) United States Patent
Bu et al.

(10) Patent No.: US 10,802,205 B2
(45) Date of Patent: Oct. 13, 2020

(54) BACKLIGHT MODULE, DISPLAY MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhanchang Bu, Beijing (CN); Yang Chu, Beijing (CN); Xian Li, Beijing (CN); Ming Chen, Beijing (CN); Haijun Shi, Beijing (CN); Wenjia Sun, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 50 days.

(21) Appl. No.: 15/774,121

(22) PCT Filed: Sep. 29, 2017

(86) PCT No.: PCT/CN2017/104311
§ 371 (c)(1),
(2) Date: May 7, 2018

(87) PCT Pub. No.: WO2018/126746
PCT Pub. Date: Jul. 12, 2018

(65) Prior Publication Data
US 2019/0107665 A1 Apr. 11, 2019

(30) Foreign Application Priority Data

Jan. 5, 2017 (CN) .......................... 2017 1 0008240

(51) Int. Cl.
*G09F 9/33* (2006.01)
*F21V 8/00* (2006.01)
(Continued)

(52) U.S. Cl.
CPC ........... *G02B 6/0088* (2013.01); *G02B 6/005* (2013.01); *G02B 6/0053* (2013.01); *G09F 9/00* (2013.01);
(Continued)

(58) Field of Classification Search
CPC .... G02B 6/0088; G02B 6/005; G02B 6/0036; G02B 6/0055; G02B 6/0061; G02B 6/0065; G09F 9/3023; G09F 9/33; G09F 9/00
See application file for complete search history.

(56) References Cited

U.S. PATENT DOCUMENTS

2008/0285304 A1    11/2008    Rankin, Jr. et al.
2009/0091948 A1    4/2009    Wang et al.
(Continued)

FOREIGN PATENT DOCUMENTS

CN    101334557 A    12/2008
CN    101408640 A    4/2009
(Continued)

OTHER PUBLICATIONS

International Search Report and Written Opinion in corresponding International Patent Application No. PCT/CN2017/104311, dated Jul. 12, 2018. 35 pages.
(Continued)

*Primary Examiner* — Anabel Ton
(74) *Attorney, Agent, or Firm* — Leason Ellis LLP

(57) ABSTRACT

A backlight module, a display module and a display device are disclosed. The display module includes a backlight module; a display panel located at a light exit side of the backlight module; and a first optical adhesive layer located between the backlight module and the display panel. The display panel and the backlight module are adhered to each other through the first optical adhesive layer.

12 Claims, 4 Drawing Sheets

(51) Int. Cl.
  *G09F 9/00* (2006.01)
  *G09F 9/302* (2006.01)
  *G06F 9/302* (2018.01)
(52) U.S. Cl.
  CPC .............. *G09F 9/3023* (2013.01); *G09F 9/33* (2013.01); *G02B 6/0036* (2013.01); *G02B 6/0055* (2013.01); *G02B 6/0061* (2013.01); *G02B 6/0065* (2013.01)

(56) References Cited

U.S. PATENT DOCUMENTS

| | | | |
|---|---|---|---|
| 2010/0296027 A1 | 11/2010 | Matsuhira et al. | |
| 2011/0255303 A1* | 10/2011 | Nichol | G02B 6/006 362/606 |
| 2011/0273906 A1* | 11/2011 | Nichol | G02B 6/0076 362/607 |
| 2011/0277361 A1* | 11/2011 | Nichol | G02B 6/0018 40/541 |
| 2012/0106197 A1* | 5/2012 | Lai | B32B 37/12 362/609 |
| 2012/0113672 A1* | 5/2012 | Dubrow | G02B 6/0073 362/602 |
| 2014/0029295 A1* | 1/2014 | Hsiao | G02B 6/0011 362/606 |
| 2014/0056028 A1* | 2/2014 | Nichol | G02B 6/0028 362/611 |
| 2014/0140091 A1* | 5/2014 | Vasylyev | G02B 6/001 362/606 |
| 2015/0346418 A1 | 12/2015 | Chen et al. | |
| 2016/0342011 A1* | 11/2016 | Zhang | G02B 6/005 |
| 2017/0115440 A1* | 4/2017 | Zhu | G02B 6/005 |
| 2017/0153385 A1 | 6/2017 | Chang | |
| 2018/0120492 A1* | 5/2018 | Lee | G02B 6/005 |

FOREIGN PATENT DOCUMENTS

| | | |
|---|---|---|
| CN | 102062972 A | 5/2011 |
| CN | 102043276 B | 7/2012 |
| CN | 103105641 A | 5/2013 |
| CN | 203336480 U | 12/2013 |
| CN | 103982827 A | 8/2014 |
| CN | 104832841 A | 8/2015 |
| CN | 105093387 A | 11/2015 |
| CN | 105652353 A | 6/2016 |
| CN | 106195765 A | 12/2016 |
| KR | 1020160033833 A | 3/2016 |
| WO | 02082358 A1 | 10/2002 |

OTHER PUBLICATIONS

Chinese Office Action in corresponding Chinese Application No. 201710008240.X dated Apr. 23, 2019 (an English translation attached hereto). 21 pages.

Extended European Search Report issued in corresponding European Patent Application No. 17866377.9 dated Jul. 13, 2020. 8 pages.

* cited by examiner

BACKLIGHT MODULE, DISPLAY MODULE AND DISPLAY DEVICE

CROSS-REFERENCE OF RELATED APPLICATIONS

This application is a U.S. National Stage application under 35 U.S.C. § 371 of International Patent Application No. PCT/CN2017/104311, which was filed on Sep. 29, 2017, and also claims priority to the Chinese patent application No. 201710008240.X, which was filed with the SIPO on Jan. 5, 2017, the entire disclosure of which is incorporated herein by reference as part of the present application.

TECHNICAL FIELD

At least one embodiment of the present disclosure relates to a backlight module, a display module and a display device.

BACKGROUND

Various types of super-thin display modules have emerged in an endless stream since a light guide plate of Corning glass came out. In order to make a thickness of the module as small as possible, manufactures have started to utilize a solution of bonding a reflector plate onto a light guide plate of glass through an adhesive layer and then attaching a back-plate PET (polyethylene terephthalate) layer thereon as a decoration layer, so as to achieve saving a back seal and reducing a cost while decreasing an overall thickness. However, the thickness of existing display module cannot be further reduced due to a restriction in a design structure of the display module itself.

SUMMARY

At least one embodiment of the present disclosure provides a display module, including a backlight module; a display panel located at a light exit side of the backlight module; and a first optical adhesive layer located between the backlight module and the display panel. The display panel and the backlight module are adhered to each other through the first optical adhesive layer.

For example, in the display module provided at least one embodiment of the present disclosure, the backlight module includes: a light guide plate including two primary surfaces opposite to each other and at least one side surface; and a light extraction film including a light incident side and a light exit side opposite to each other. The light guide plate is adhered onto the light incident side of the light extraction film through a second optical adhesive layer, and the light extraction film is located between the light guide plate and the display panel.

For example, in the display module provided by at least one embodiment of the present disclosure, the second optical adhesive layer is directly contacted with the light guide plate and the light incident side of the light extraction film; and/or, the first optical adhesive layer is directly contacted with the display panel and the light exit side of the light extraction film.

For example, the display module provided by at least one embodiment of the present disclosure further includes a decoration layer adhered onto a side of the light guide plate far away from the light extraction film.

For example, in the display module provided by at least one embodiment of the present disclosure, the decoration layer and the light guide plate are adhered to each other through a third optical adhesive layer, and the third optical adhesive layer has a refractive index smaller than that of the light guide plate.

For example, in the display module provided by at least one embodiment of the present disclosure, the light incident side of the light extraction film includes a plurality of transparent micro-convex structures configured to extract light from the light guide plate.

For example, in the display module provided by at least one embodiment of the present disclosure, each of the micro-convex structures has a refractive index greater than or equal to that of the light guide plate.

For example, in the display module provided by at least one embodiment of the present disclosure, each of the micro-convex structures has a cross-sectional width which is increased with an increase of a distance from the light guide plate.

For example, in the display module provided by at least one embodiment of the present disclosure, each of the micro-convex structures has a cross-sectional shape including at least one selected from the group consisted of semicircle, semi-ellipse, trapezoid, hexagon, and octagon.

For example, in the display module provided by at least one embodiment of the present disclosure, the second optical adhesive layer is configured to cover an entirety of the primary surface of the light guide plate which faces the second optical adhesive layer; or, an orthographic projection of the second optical adhesive layer on the light guide plate is coincident with an orthographic projection of the micro-convex structure on the light guide plate.

For example, in the display module provided by at least one embodiment of the present disclosure, the backlight module further includes a light source configured to be opposite to the side surface of the light guide plate.

For example, in the display module provided by at least one embodiment of the present disclosure, a distribution density of the micro-convex structures on the light extraction film is increased with an increase of a distance between the micro-convex structures and the light source.

For example, in the display module provided by at least one embodiment of the present disclosure, the second optical adhesive layer is configured to cover an entirety of the primary surface of the light guide plate which faces the second optical adhesive layer; or, an orthographic projection of the second optical adhesive layer on the light guide plate is coincident with an orthographic projection of a surface of the micro-convex structure faces the light guide plate on the light guide plate.

For example, the display module provided by at least one embodiment of the present disclosure further includes a side sealant covering a portion of a side surface of the display module except that provided with the light source.

For example, in the display module provided by at least one embodiment of the present disclosure, a material of the light extraction film includes at least one selected from the group consisted of transparent polyethylene terephthalate, polycarbonate, polymethyl methacrylate and polysulfone resin; and/or, a material of the light guide plate includes at least one selected from the group consisted of glass, polymethyl methacrylate, and copolymer of methyl methacrylate and styrene.

For example, in the display module provided by at least one embodiment of the present disclosure, a difference between a refractive index of the second optical adhesive layer and a refractive index of the light guide plate is smaller than or equal to 0.1.

For example, in the display module provided by at least one embodiment of the present disclosure, a difference between a refractive index of the first optical adhesive layer and a refractive index of the light guide plate is smaller than or equal to 0.1.

At least one embodiment of the present disclosure provides a display device including any one of the above-mentioned display modules.

At least one embodiment of the present disclosure provides a backlight module, including: a light guide plate including two primary surfaces opposite to each other and at least one side surface; and a light extraction film including a light incident side and a light exit side opposite to each other. The light incident side of the light extraction film is adhered onto any of the primary surfaces of the light guide plate through a second optical adhesive layer.

For example, in the backlight module provided by at least one embodiment of the present disclosure, a difference between a refractive index of the second optical adhesive layer and a refractive index of the light guide plate is smaller than or equal to 0.1.

For example, the backlight module provided by at least one embodiment of the present disclosure further includes a decoration layer adhered onto a side of the light guide plate far away from the light extraction film.

For example, in the backlight module provided by at least one embodiment of the present disclosure, the decoration layer and the light guide plate are adhered to each other through a third optical adhesive layer, and the third optical adhesive layer has a refractive index smaller than that of the light guide plate.

For example, in the backlight module provided by at least one embodiment of the present disclosure, the light incident side of the light extraction film includes a plurality of transparent micro-convex structures configured to extract light from the light guide plate.

For example, in the backlight module provided by at least one embodiment of the present disclosure, each of the micro-convex structures has a refractive index greater than or equal to that of the light guide plate; and/or, each of the micro-convex structures has a cross-sectional width which is increased with an increase of a distance from the light guide plate.

For example, the backlight module provided by at least one embodiment of the present disclosure further includes a light source disposed to be opposite to the side surface of the light guide plate.

For example, in the backlight module provided by at least one embodiment of the present disclosure, a distribution density of the micro-convex structures on the light extraction film is increased with an increase of a distance between the micro-convex structures and the light source.

In the display module and the display device thereof provided by at least one embodiment of the present disclosure, the components in the display module can achieve a design of full adhesion. In this way, the module design structure is simplified, and hence the thickness of the display module is further reduced.

BRIEF DESCRIPTION OF THE DRAWINGS

Hereinafter, the drawings of embodiments will be briefly introduced so as to provide more definite explanations of the embodiments of the present disclosure. Obviously, the drawings described as below merely refer to some embodiments of the present disclosure and are not intended to constitute any limitation to the present disclosure.

DETAILED DESCRIPTION

Figure 1:
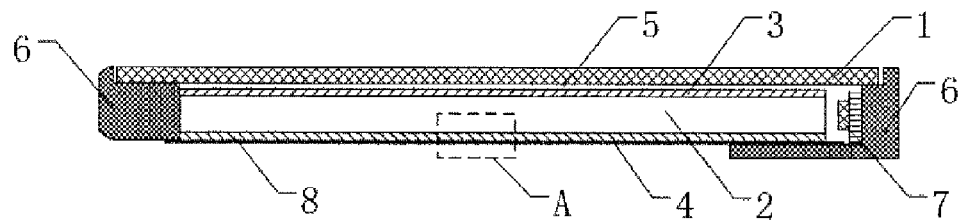
FIG. 1 is a structural diagram illustrating a display module.

In order to make objects, technical solutions and advantages of the embodiments of the present disclosure apparent, the technical solutions of the embodiments will be described in a clearly and fully understandable way in connection with the drawings related to the embodiments of the invention. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The word "comprise", "include" or the like only indicates that an element or a component before the word contains elements or components listed after the word and equivalents thereof, not excluding other elements or components. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a structural design of display module, a reflector plate may be adhered onto a light guide plate through an adhesive layer, and then a back plate may be further attached as a shielding layer, so as to reduce a thickness of the display module as far as possible. At the same time, in order to ensure the transmission of light by total reflection inside the light guide light, the reflector plate usually is adhered onto the light guide plate in the following two ways: one is sticking by directly using an adhesive layer having a small refractive index, and the other one is adhering by using a reflector plate having a small refractive index through a normal optical adhesive layer. Additionally, in order to extract light from the light guide plate, it also needs to prepare dots on the light guide plate or attach a film layer for preparing the dots. The dots may break a condition of total reflection transmission of the light in the light guide plate so as to achieve the extraction of light. However, because the light under such circumstance belongs to scattered light without any directivity, it further needs an optical film (including structures such as prism film and diffusion film) to converge light at a certain angle so as to increase a brightness of display. Several intervening structures such as air layer may also be disposed between the optical film and the display panel, which results in that the thickness of the display module cannot be further reduced because the existence of these intervening structures limits a simplification of module structure and optical structure.

For example, FIG. 1 is a structural diagram illustrating a display module. The display module includes a display panel 1, a light guide plate 2, an optical film 3 disposed on the light guide plate 2, a reflector plate 8 disposed on the light guide plate 2 to be opposite to the optical film 3, a light source 7, a frame 6 and a decoration layer 4. The light source 7 supplies light for the display module; the light guide plate 2 is configured to transform the light from point light to area light. The light entering the light guide plate 2 will experience a total reflection; the reflector plate 8 allows the light at the reflector plate to be totally reflected and only be extracted from a side of the light guide plate 2 far away from the reflector plate 8; the optical film 3 is configured to orientate and converge the extracted light to the display panel 1.

Normally, structures such as the display panel 1 and the optical film 3 are fixed through the frame 6. As a result, an interval area, that is, an air layer 5 will be definitely existed between the display panel 1 and the optical film 3. At the same time, the optical film 3 may serve to orientate and converge the extracted light. However, the optical film 3 includes several types of films (e.g., structures such as prism film and scattering film) which are also provided with air layers there-between. Therefore, support structures such as the frame 6 are necessary for fixing the components of the display module.

Figure 2:
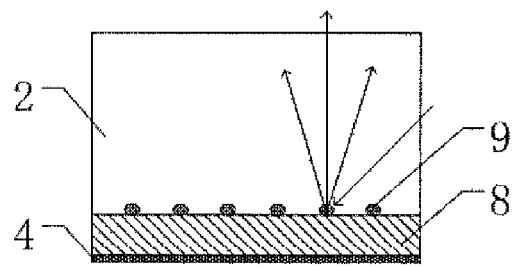
FIG. 2 is a structural diagram illustrating a cross section of area A in the display module of FIG. 1.

FIG. 2 is a structural diagram illustrating a cross section of area A in the display module of FIG. 1. The light emitted from the light source 7 enters the light guide plate 2. In order to break the condition of total reflection transmission of light in the light guide plate 2 and to allow the light to be extracted from the light exit surface 16 of the light guide plate 2, as illustrated in FIG. 2, dots 9 are needed to be disposed on the light guide plate. The dots 9 break the condition of total reflection transmission of light in the light guide plate 2. Furthermore, the light may only be extracted from the light exit side 16 of the light guide plate 2 and enter the optical film 3 because the reflector plate 8 is disposed on the other side of the light guide plate 2 which is opposite to the optical film 3. Thus it can be seen that the design of the display module requires for structures such as dots 9 and reflector plate 8 to be further disposed.

The dots may be prepared on the light guide plate by ways including printing dots onto the light guide late or attaching a film layer provided with dots; locations of the dots are not limited to the side of the light guide plate facing to the reflector plate, for example, the side of the light guide plate far away from the reflector plate may also be provided with the dots.

As illustrated in FIG. 1 and FIG. 2, the existence of multiple intervening structures (e.g., air layer 5, reflector plate 8, etc.) in the design structure of the display module restricts the simplification of the module structure and the optical structure, resulting that the thickness of the module and the difficulty of manufacturing process cannot be further reduced.

At least one embodiment of the present disclosure provides a backlight module, a display module and a display device. The display module includes a backlight module; a display panel located at a light exit side of the backlight module; and a first optical adhesive layer located between the backlight module and the display panel. The display panel and the backlight module are adhered through the first optical adhesive layer. The backlight module includes: a light guide plate including two primary surfaces opposite to each other and at least one side surface; and a light extraction film including a light incident side and a light exit side opposite to each other. The light guide plate is adhered onto the light incident side of the light extraction film through a second optical adhesive layer. The primary surface of the light guide plate and the light incident side of the light extraction film are adhered through the second optical adhesive layer. For example, in at least one embodiment of the present disclosure, the light extraction film is located between the light guide plate and the display panel.

In the display module provided by at least one embodiment of the present disclosure, the display module may include a backlight module. Hereinafter the structure of the backlight module will be described along with embodiments related to the display module. In the display module provided by at least one embodiment of the present disclosure, the light extraction film is disposed on the light guide plate to replace the original optical film structure, so that the light is extracted from the light guide plate and orientated to a display direction without structures such as reflector plate, and that the light guide plate, the light extraction film and the display panel may be adhered to each other; that is, a design of full adhesion is achieved in the display module. Correspondingly, the light guide plate and the light extraction film can also be adhered to each other; that is, a design of full adhesion is also achieved in the backlight module. The light extraction film has an extremely small thickness; as a result, for future design trends of modules (backlight module and display module) with the above-mentioned structure, the thickness is basically determined by the display panel and the light guide plate, which opens up a new field of module design.

It should be explained that, for example, in the display module provided by at least one embodiment of the present disclosure, the second optical adhesive layer may be, for example, directly contacted with the light guide plate and the light incident side of the light extraction film; or, the first optical adhesive layer may be, for example, directly contacted with the display panel and the light exit side of the light extraction film.

Hereinafter, the backlight module, the display module and the display device provided by at least one embodiment of the present disclosure will be described in conjunction with the drawings.

Figure 3:
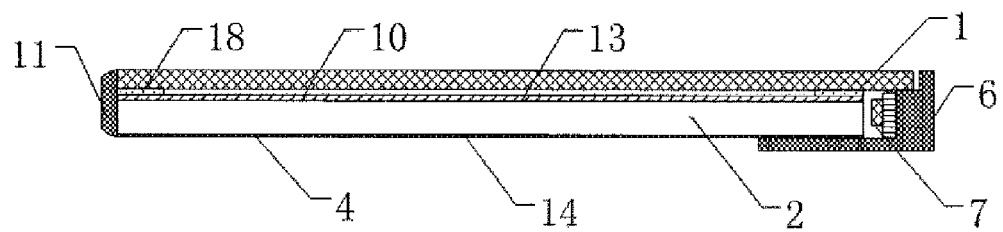
FIG. 3 is a structural diagram illustrating a display module provided by an embodiment of the present disclosure.

At least one embodiment of the present disclosure provides a display module. FIG. 3 is a structural diagram illustrating a display module provided by an embodiment of the present disclosure. For example, as illustrated in FIG. 3, the display module includes a backlight module (not illustrated), a display panel 1 and a first optical adhesive layer 18 (not illustrated in FIG. 3, referring to FIG. 5); the display panel 1 is located at a light exit side of the backlight module; the first optical adhesive layer 18 is located between the display panel 1 and the backlight module; the display panel 1 and the backlight module are adhered through the first optical adhesive layer. The backlight module may include: a light guide plate 2 including two primary surfaces (including an upper surface 13 and a lower surface 14) opposite to each other and at least one side surface (not illustrated); and a light extraction film 10 including a light incident side 15 and a light exit side 16 opposite to each other (referring to FIG. 5); the light incident side 15 of the light extraction film 10 is adhered onto any of the primary surfaces of the light guide plate 2 through a second optical adhesive layer (not illustrated in FIG. 3, referring to FIG. 5). The light exit side of the backlight module may be a side on which the light exit side 16 of the light extraction film 10 is located.

The light extraction film 10 and the display panel 1 are adhered through the first optical adhesive layer so as to achieve a close bonding between the display panel and the light exit side of the light extraction film. The first optical adhesive layer may be distributed between the light extraction film 10 and the display panel 1 in several manners, which may achieve the same technical effect as long as the first optical adhesive layer allows the optical extraction film 10 and the display panel 1 to be closely adhered with each other. For example, the first optical adhesive layer may be distributed in a periphery area between the optical extraction film 10 and the display panel 1; or, further, for example, the first optical adhesive layer may also be distributed over an entire surface of the optical extraction film 10 or an entire surface of the display panel 1, that is, the first optical adhesive layer completely fills a gap between the optical extraction film 10 and the display panel 1.

The first optical adhesive layer may, for example, completely fill the gap between the whole display panel 1 and the optical extraction film 10, or may only bond a border of the display panel 1 with a bonder of the optical extraction film 10. In the case where the first optical adhesive layer completely fills the gap between the display panel 1 and the optical extraction film 10, a refraction effect of the light transmitted between the display panel 1 and the optical extraction film 10 may be effectively reduced so as to provide clearer display.

For example, in at least one embodiment of the present disclosure, as illustrated in FIG. 3, the first optical adhesive layer 18 is only distributed in periphery areas of the display panel 1 and the optical extraction film 10 so as to closely bond the display panel 1 with the light exit side of the light extraction film 10.

Figure 4:
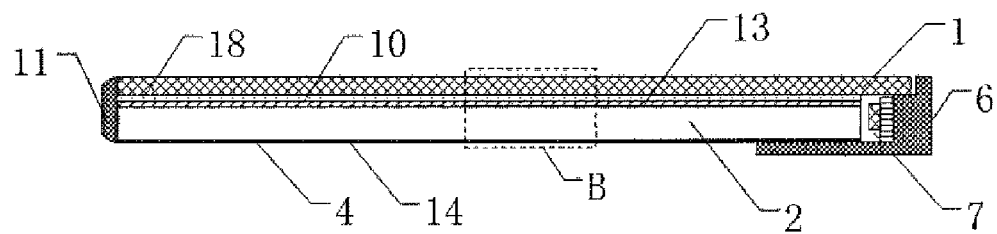
FIG. 4 is a structural diagram illustrating another display module provided by an embodiment of the present disclosure.

For example, in at least one embodiment of the present disclosure, FIG. 4 is a structural diagram illustrating another display module provided by an embodiment of the present disclosure. As illustrated in FIG. 4, the first optical adhesive layer 18 completely fills the gap between the display panel 1 and the optical extraction film 10. Under such design manner, for example, the first optical adhesive layer is configured to have a refractive index identical with that of the display panel 1 or the optical extraction film 10, so as to effectively reduce a refraction effect of light transmitted between the display panel 1 and the optical extraction film 10 and provide clearer display.

Hereinafter the technical solution of the following embodiments of the present disclosure will be described with reference to the display module structure illustrated in FIG. 4 by way of example. Under such structure, the first optical adhesive layer completely fills the gap between the display panel and the optical extraction film.

In at least one embodiment of the present disclosure, as illustrated in FIG. 4, a material for preparing the light guide plate 2 may include glass, polymethyl methacrylate (PET), copolymer of methyl methacrylate and styrene (MS) and the like, because the light guide plate 2 requires good light transmittance. Furthermore, a shape of the light guide plate 2 is not limited to rectangle as illustrated in FIG. 4, and may be other structures such as circle, sector, triangle and polygon.

In at least one embodiment of the present disclosure, light is extracted from the light guide plate through the light extraction film and then enters the display panel. In order to guarantee a clear display, it's required to ensure that the light is propagated with its position or direction unchanged, as far as possible. As a result, it needs to decrease a difference in refractive index of respective structures where light passes through during this process, as far as possible.

For example, a refractive index of the light extraction film, for example, a refractive index of the light incident side thereof, is closer to or greater than that of the light guide plate. For example, in the case where the refractive index of the light incident side of the light extraction film is greater than that of the light guide plate, the light passing through the light guide plate is easier to enter the light extraction film.

The refractive index of the second optical adhesive layer may be closer to that of the light guide plate; and the refractive index of the first optical adhesive layer may be closer to that of the light guide plate. A magnitude of difference in refractive index between the second optical adhesive layer and the light guide plate, or a magnitude of difference in refractive index between the first optical adhesive layer and the light guide plate is not particularly limited in the embodiments of the present disclosure. For example, the difference in refractive index between the second optical adhesive layer and the light guide plate may be smaller than or equal to 0.1; for example, the difference in refractive index between the first optical adhesive layer and the light guide plate may be smaller than or equal to 0.1. More specifically, for example, when a light guide plate having a refractive index of 1.5 is utilized, the refractive index of the second optical adhesive layer is 1.4~1.6, for example, and the refractive index of the first optical adhesive layer is 1.4~1.6, for example; the light extraction film 10 is made of a light transmittance material.

The material of preparing the light extraction film 10 is not limited in the embodiments of the present disclosure. For example, in at least one embodiment of the present disclosure, the material of preparing the light extraction film may include at least one selected from the group consisted of transparent polyethylene terephthalate, polycarbonate, polymethyl methacrylate and polysulfone resin.

For example, in at least one embodiment of the present disclosure, a shape of the display panel 1 is not limited to rectangle illustrated in FIG. 4, and may be other structures such as planar surface or curved surface in a shape of circle, sector, triangle and polygon.

For example, in at least one embodiment of the present disclosure, as illustrated in FIG. 4, the display module may further include a light source 7 disposed to be opposite to any side surface of the light guide plate 2. The light source 7 may provide light into the light guide plate 2.

As for the type of the light source 7, it may be a light bar such as light-emitting diode (LED), organic LED, polymer LED and laser; and may also be a multi-point light source; as long as it provides uniform light for the light guide plate 2. The number of the light source 7 is not limited to one as illustrated in FIG. 4. For example, it may be possible to dispose another light source 7 at the other side of the light guide plate 2 opposite to the light source 7; and it may be also possible to dispose one light source 7 at each sides of the light guide plate 2 so as to improve an uniformity of the light distributed in the light guide plate 2. For example, the light source 7 is not limited to a side light source as illustrated in FIG. 4, and also may be a configured as a direct-lit backlight source to provide light for the light guide plate 2.

For example, in at least one embodiment of the present disclosure, as illustrated in FIG. 4, the display module further includes a decoration layer 4 which is disposed at a side of the light guide plate 2 far away from the light extraction film 10. The decoration layer 4 is configured to block light at the rear of the display module, as well as provide safety and decoration, etc.

The decoration layer and the light guide plate are adhered through a third optical adhesive layer (not illustrated), for example. The third optical adhesive layer is an optical adhesive layer with a smaller refractive index, as compared with that of the light guide plate. For example, when the refractive index of the light guide plate is 1.5, the refractive index of the third optical adhesive layer may be 1.25~1.35 so as to satisfy the condition of total reflection of light at an interface between the light guide plate and the third optical adhesive layer.

The decoration layer is further required to possess certain strength, apart from severing for blocking light, so as to provide support or protection for the display module. The decoration layer may be made of, for example, a light-blocking material such as nontransparent polymethyl methacrylate (PET); and may also be made of a transparent PET coated with a light-blocking material, for example.

For example, in at least one embodiment of the present disclosure, as illustrated in FIG. 4, a side surface of the display module is provided with a side sealant. For example, a portion of the side surface of the display module, apart from that corresponding to the light source 7, is provided with (e.g., coated with) the side sealant. The side sealant is configured to provide safety and also to prevent the display module from light leakage. Because the display module is designed as full adhesion, it doesn't need a frame to fix the entire display module at the upper and lower primary surfaces. With such a structure, the side sealant may replace the frame to provide light-blocking effect, fixing effect and safety effect; moreover, the side sealant is only disposed on the side surface of the display module, which not only reduces the thickness of the entire display module on the basis of a simplified design structure but also allows for fashion style, as compared with the conventional structure.

It should be explained that, in the display module provided by at least one embodiment of the present disclosure, a design of full adhesion can be achieved among the display panel, the light extraction film, the light guide plate and the decoration layer, for example, through optical adhesive layers (e.g., including the second optical adhesive layer, the first optical adhesive layer and the third optical adhesive layer), thus the entire display panel only needs to have special design(s) such as frame structure at location(s) where the light source(s) is (are) located to fix component(s) such as light source onto the display module. However, those skilled in the art should be appreciated that, other structures of the frame, such as annular frame, may also be applicable for the display module design of the present disclosure.

Figure 5:
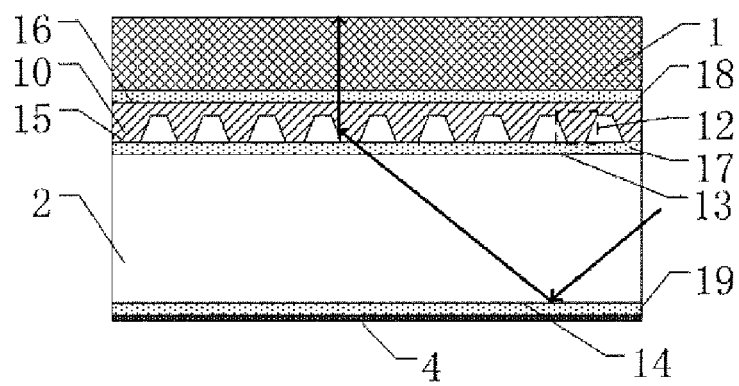
FIG. 5 is a structural diagram illustrating a cross section of area B in the display module of FIG. 4.

For convenience of description of the particular structure of the display module provided by at least one embodiment of the present disclosure, an example of at least one embodiment of the present disclosure describes a schematic diagram illustrating partial structure of one of the display modules provided by the embodiments of the present disclosure. FIG. 5 is a structural diagram illustrating a cross section of area B in the display module of FIG. 4. As illustrated in FIG. 5, the light guide 2 and the upper surface 13 of the light extraction film 10 are adhered through the second optical adhesive layer 17; the light extraction film 10 and the lower surface 14 of the display panel 1 are adhered through the first optical adhesive layer 18; the light guide plate 2 and the decoration layer 4 are adhered through the third optical adhesive layer 19. In this way, the entire structure of the display module can be designed as full adhesion while achieving an extraction of light from the light guide plate 2.

For example, in at least one embodiment of the present disclosure, the light incident side of the light extraction film includes a plurality of micro-convex structures which are configured to extract light from the light guide plate. For example, in an embodiment provided by the present disclosure, a distribution density of the micro-convex structure on the light extraction film is increased with a distance from the light source. For example, as illustrated in FIG. 5, the light incident side 15 of the light extraction film 10 includes a plurality of micro-convex structures 12 which are adhered with the upper surface 13 of the light guide plate 2 through the second optical adhesive layer. At the location where the micro-convex structure 12 is disposed, light may enter the light extraction film 10 from the upper surface 13 of the light guide plate 2 through the micro-convex structure 12; furthermore, an energy of the light will be lost with a propagation inside the light guide plate 2, and the farther from the light source 7 is, the smaller the brightness will be. In order to ensure the uniformity of the light exiting the light guide plate 2, it may be possible to increase the density of the micro-convex structure 12 disposed far away from the light source 7.

It should be explained that, for convenience of understanding, in at least one embodiment of the present disclosure, the refractive index of the second optical adhesive layer is preferably identical with that of the light guide plate; in this case, from the aspect of optical architecture, the second optical adhesive layer and the light guide plate may be considered to be integrated. Thus, in describing the propagation of light, it can be expressed that the light propagates into the light extraction film from the light guide plate even when a second optical adhesive layer is provided between the micro-convex structure and the light guide plate.

For example, in at least one embodiment of the present disclosure, the refractive index of the micro-convex structure is greater than or equal to that of the light guide plate. For example, as illustrated in FIG. 5, when the refractive index of the micro-convex structure 12 is greater than or equal to that of the light guide plate 2, the light in the light guide plate 2, when arrives at a point where the micro-convex structure 12 contacts the light guide plate 2, will directly enter the micro-convex structure 12 without experiencing a total reflection. An interval area between adjacent micro-convex structures 12 may be filled with air or material having low refractive index, so that the light experiences a total reflection at the interface between the upper surface 13 of the light guide plate 2 and the interval area but is not extracted out; in this way, the light in the light guide plate can only enter the micro-convex structure 12.

Particular location of the second optical adhesive layer 17 as disposed is not limited in the embodiment of the present disclosure, as long as the second optical adhesive layer 17 allows the light in the light guide plate 2 to be extracted to the micro-convex structure 12.

For example, in at least one embodiment of the present disclosure, as illustrated in FIG. 5, the second optical adhesive layer 17 may be configured to cover the entire primary surface (e.g. the upper surface 13) of the light guide plate 2 facing to the second optical adhesive layer 17.

Figure 6:
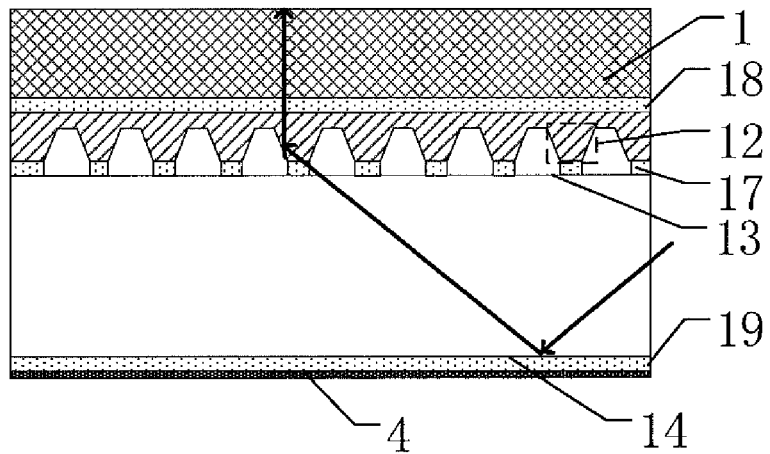
FIG. 6 is a sectional view illustrating partial area of a display module provided by an embodiment of the present disclosure.

For example, in at least one embodiment of the present disclosure, FIG. 6 is a sectional view illustrating partial area of a display module provided by an embodiment of the present disclosure. For example, as illustrated in FIG. 6, the second optical adhesive layer 17 is only disposed in the area where the micro-convex structure 12 is located. For example, an orthographic projection of the second optical adhesive layer 17 on the light guide plate 2 is coincident with an orthographic projection of a surface of the micro-convex structure 12 facing to the light guide plate 2 on the light guide plate 2; e.g., the second optical adhesive layer 17 is disposed on the surface of the micro-convex structure 12 closer to the light guide late 2, that is, the micro-convex structure 12 is only adhered with the upper surface 13 of the light guide plate 2. Due to the difference in refractive index, the light in the light guide plate 2 is not easy to exit at the interval region between the micro-convex structures 12, but is easier to exit at the micro-convex structure 12 because of the second optical adhesive layer 17 as disposed.

Figure 7:
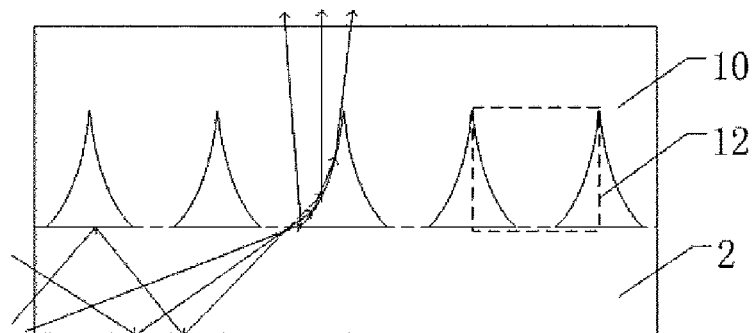
FIG. 7 is a schematic diagram illustrating a principle of light extraction for a light extraction film provided by an embodiment of the present disclosure.

For example, in at least one embodiment of the present disclosure, the micro-convex structure 12 has a cross-sectional width which is increased with an increase of a distance from the light guide plate. FIG. 7 is a schematic diagram illustrating a principle of light extraction for a light extraction film provided by an embodiment of the present disclosure. As illustrated in FIG. 7, upon the light in the light guide plate 2 entering the micro-convex structure 12, it continues to experience a total reflection within the micro-convex structure 12, and a curved surface of the micro-convex structure 12 will allow the light upon total reflection to be tended to a direction perpendicular to the light guide plate 2.

The micro-convex structure 12 may have various shapes, which are not limited to semi-ellipse as illustrated in FIG. 7. Other shapes such as semi-circle, trapezoid, hexagon, and octagon that allow the light to experience a total reflection at a surface of a side border of the micro-convex structure and converge the light in the direction perpendicular to the light guide plate 2 may also achieve the same technical effect.

It should be explained that, in at least one embodiment of the present disclosure, taking the light guide plate as a reference, a plane direction of the cross section is a direction perpendicular to the primary surface (e.g., the upper surface) of the light guide plate.

For example, the micro-convex structures may be distributed on the light incident side of the light extraction film like dots, and most preferably, for example, the micro-convex structures may completely cover the light incident side of the light extraction film so that the light as extracted is more uniformly distributed. Preferably, adjacent micro-convex structures are collinear or tangent. Taking a hemi-ellipsoidal micro-convex structure as an example, that is to say, side surfaces of adjacent micro-convex structures may be tangent or share a common surface, and in a contour line of the cross section of the micro-convex structure, an angle between a side edge of the micro-convex structure and the upper surface of the light guide plate may be 10~50 degree (the angle between the side edge and the upper surface of the light guide plate may be designed according to actual demand without limited in the embodiments of the present disclosure). On this basis, a direction of the light as extracted by the light extraction film may be adjusted by changing a shape of the contour lines of both side surfaces of the cross section of the micro-convex structure. At the same time, an uniformity of the light as extracted by the light extraction film may be adjusted by changing a magnitude of a contacting area between the micro-convex structure and the light guide plate (when a second optical adhesive layer is disposed between the micro-convex structure and the light guide plate, changing a magnitude of a contacting area between the micro-convex structure and the second optical adhesive layer).

In at least one embodiment of the present disclosure, a distribution density of the micro-convex structures on the light extraction film is increased with an increase of a distance from the light source, which essentially allows a contacting area between the micro-convex structure and the upper surface of the light guide plate to be increased with the increase of the distance from the light source. As a result, a distribution state of the micro-convex structures is not limited to the distribution of density, and the same technical effects can be achieved as long as it is a solution which allows the contacting area between the micro-convex structure and the upper surface of the light guide plate to be increased with the increase of the distance from the light source. For convenience of explanation of the distribution state of the micro-convex structures on the light extraction film in the above-mentioned embodiments, the distribution state of the micro-convex structures will be described in the following embodiments with reference to a display module structure in which the light source is a side light source and the cross section of the micro-convex structure is semi-oval, by way of example.

Figure 8:
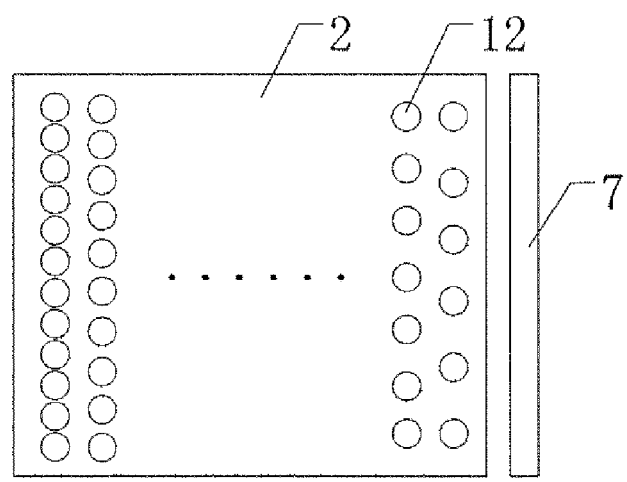
FIG. 8 is a schematic diagram illustrating a distribution of micro-convex structures on a light extraction film provided by an embodiment of the present disclosure.

For example, in at least one embodiment of the present disclosure, FIG. 8 is a schematic diagram illustrating a distribution of micro-convex structures on a light extraction film provided by an embodiment of the present disclosure. FIG. 8 is a plan view, and is viewed in a direction perpendicular to the upper surface of the light guide plate. For example, as illustrated in FIG. 8, the light source 7 (e.g., a side light source) is disposed at a side of the light guide plate 2 to provide the light guide plate 2 with light; the distribution density of the micro-convex structures 12 is increased with the increase of the distance from the light source 7. At a region closer to the light source 7, a brightness of the light is larger, but the light in this region entering the micro-convex structures 12 through the light guide plate 2 is little because the distribution density of the micro-convex structures 12 is smaller; at a region farther from the light source 7, the brightness of the light is weakened due to the energy loss during the propagation in the light guide plate 2, but the light in this region entering the micro-convex structures 12 through the light guide plate 2 is more because the distribution density of the micro-convex structures 12 is greater; in this way, an uniformity of light exiting the light guide plate may be achieved with no difference in brightness.

Figure 9:
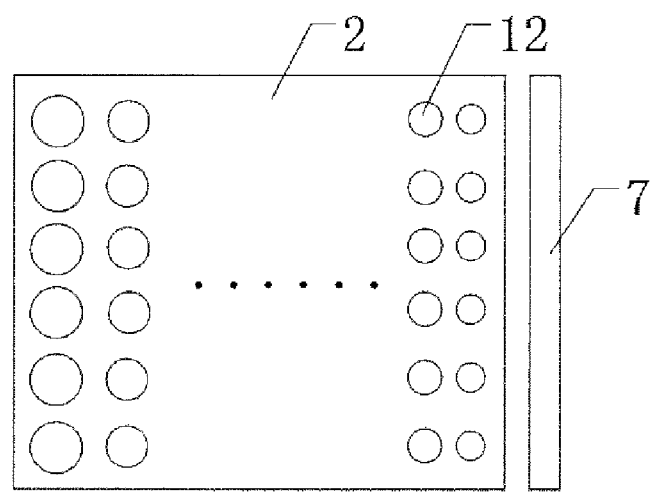
FIG. 9 is a schematic diagram illustrating a distribution of micro-convex structures on another light extraction film provided by an embodiment of the present disclosure.

For example, in at least one embodiment of the present disclosure, FIG. 9 is a schematic diagram illustrating a distribution of micro-convex structures on another light extraction film provided by an embodiment of the present disclosure. FIG. 9 is a plan view, and is viewed in a direction perpendicular to the upper surface of the light guide plate. For example, as illustrated in FIG. 9, the light source 7 (e.g., a side light source) is disposed at a side of the light guide plate 2 to provide the light guide plate 2 with light; the contacting area between the micro-convex structures 12 and the upper surface of the light guide plate 2 is increased with the increase of the distance from the light source 7. At a region closer to the light source 7, a brightness of the light is larger, but the light in this region entering the micro-convex structures 12 through the light guide plate 2 is little because the contacting area between the micro-convex structures 12 and the upper surface of the light guide plate 2 is smaller; at a region farther from the light source 7, the brightness of the light is weakened due to the energy loss during the propagation in the light guide plate 2, but the light in this region entering the micro-convex structures 12 through the light guide plate 2 is more because the contacting area between the micro-convex structures 12 and the upper surface of the light guide plate 2 is greater; in this way, an uniformity of light exiting the light guide plate may be achieved with no difference in brightness.

It should be explained that, in at least one embodiment of the present disclosure, as illustrated in FIG. 8 and FIG. 9, the circle represented by the micro-convex structure 12 actually indicates its contacting area with the light guide plate 2; furthermore, those skilled in the art should be understood that, actually, a second optical adhesive layer 17 (not illustrated, referring to FIG. 5) is also disposed between the micro-convex structure 12 and the light guide plate 2; in at least one embodiment of the present disclosure, the contacting area between the micro-convex structure 12 and the light guide plate 2 is utilized identically to the contacting area between the micro-convex structure 12 and the second optical adhesive layer 17. FIG. 8 and FIG. 9 only illustrate the distribution of the micro-convex structures 12 at an end closer to the light source 7 and at an end far away from the light source 7; however, the distribution state of the micro-convex structures illustrated in FIG. 8 and FIG. 9 may be gradually varied; for example, taking the distribution density of the micro-convex structures as an example, it's gradually increased with the increase of the distance from the light source.

From the display module provided by the foregoing embodiments of the present disclosure, it can be seen that, in the aspect of optical architecture, as compared with the existing design structure of display module, the light guide plate has no need of disposing dots or reflector plate to extract light from the light guide plate, and the light extraction film is capable of achieving light orientation and light converge so as to replace the optical films. In addition, in such display module structure, the light is transmitted without using air as a medium, and a design of full adhesion can be achieved among the display panel, the light extraction film and the light guide plate, in which the light extraction film is thinner than the optical film and doesn't need an air layer at all. The decoration layer is also directly adhered onto the light guide plate through an adhesive layer with a low refractive index which ensures the light to be totally reflected at a side in the light guide plate far away from the light extraction film.

The display module provided by at least one embodiment of the present disclosure can achieve a design of full adhesion and has no need of using structures such as frame to fix related components of the display module; instead, side surface(s) of the display module, apart from that opposite to the light source, is (are) provided with a side sealant to provide the display module with functions of light blocking and safety. Moreover, the thickness of the light extraction film is extremely small; with such a structure design manner, the thickness of the display module is further reduced and can be considered to be determined by the thickness of the display panel and the light guide plate, which opens up a new field of display module design on the basis of simplifying the design structure of display module.

At least one embodiment of the present disclosure further provides a display device including the display module provided by any of the foregoing embodiments. For example, the display device may further include structures such as a display driver unit, a power source unit and a touch unit. For example, the display device may be any device or apparatus having display function such as displayer, tablet computer, mobile phone, TV set, camera and navigation equipment.

For the present disclosure, the following statements should be noted:

(1) The accompanying drawings of the embodiments of the present disclosure involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or area may be enlarged or narrowed, that is, the drawings are not drawn in a real scale.

(3) In case of no conflict, features in one embodiment or in different embodiments of the present disclosure can be combined with each other to obtain new embodiment(s).

The foregoing are merely particular embodiments of the present disclosure, and the protection scope of the present disclosure is not limited thereto. Instead, the protection scope of the present disclosure shall be defined by the accompanying claims.

What is claimed is:

1. A display module, comprising:
   a backlight module;
   a display panel located at a light exit side of the backlight module; and
   a first optical adhesive layer located between the backlight module and the display panel,
   wherein the display panel and the backlight module are adhered to each other through the first optical adhesive layer,
   wherein the backlight module comprises:
      a light guide plate comprising two primary surfaces opposite to each other and at least one side surface; and
      a light extraction film comprising a light incident side and a light exit side opposite to each other,
      wherein the light guide plate is adhered onto the light incident side of the light extraction film through a second optical adhesive layer, and the light extraction film is located between the light guide plate and the display panel,
      wherein a refractive index of the light incident side of the light extraction film is greater than a refractive index of the light guide plate,
      wherein a difference between a refractive index of the second optical adhesive layer and the refractive index of the light guide plate is smaller than or equal to 0.1,
      wherein a difference between a refractive index of the first optical adhesive layer and the refractive index of the light guide plate is smaller than or equal to 0.1;
      further wherein: the second optical adhesive layer is directly contacted with the light guide plate and the light incident side of the light extraction film; or,
      the first optical adhesive layer is directly contacted with the display panel and the light exit side of the light extraction film.

2. The display module according to claim 1, wherein the backlight module further comprises a decoration layer adhered onto a side of the light guide plate away from the light extraction film.

3. The display module according to claim 2, wherein the decoration layer and the light guide plate are adhered to each other through a third optical adhesive layer, and the third optical adhesive layer has a refractive index smaller than that of the light guide plate.

4. The display module according to claim 1, wherein the light incident side of the light extraction film comprises a plurality of transparent micro-convex structures configured to extract light from the light guide plate.

5. The display module according to claim 4, wherein each of the micro-convex structures has a refractive index greater than or equal to that of the light guide plate.

6. The display module according to claim 4, wherein each of the micro-convex structures has a cross-sectional width which is increased with an increase of a distance from the light guide plate.

7. A display module, comprising:
a backlight module;
a display panel located at a light exit side of the backlight module; and
a first optical adhesive layer located between the backlight module and the display panel,
wherein the display panel and the backlight module are adhered to each other through the first optical adhesive layer,
wherein the backlight module comprises:
a light guide plate comprising two primary surfaces opposite to each other and at least one side surface; and
a light extraction film comprising a light incident side and a light exit side opposite to each other,
wherein the light guide plate is adhered onto the light incident side of the light extraction film through a second optical adhesive layer, and the light extraction film is located between the light guide plate and the display panel,
wherein the light incident side of the light extraction film comprises a plurality of transparent micro-convex structures configured to extract light from the light guide plate,
wherein
an orthographic projection of the second optical adhesive layer on the light guide plate is coincident with an orthographic projection of a surface of the micro-convex structure facing the light guide plate on the light guide plate.

8. The display module according to claim 7, wherein the backlight module further comprises a light source disposed to be opposite to the side surface of the light guide plate, and a distribution density of the micro-convex structures on the light extraction film is increased with an increase of a distance between the micro-convex structures and the light source.

9. The display module according to claim 8, further comprising a side sealant covering a portion of the side surface of the display module except that provided with the light source.

10. A display device, comprising the display module according to claim 1.

11. A backlight module, comprising:
a light guide plate comprising two primary surfaces opposite to each other and at least one side surface;
a light extraction film comprising a light incident side and a light exit side opposite to each other, and a decoration layer adhered to the light guide plate, the decoration layer configured to block light at the backight module,
wherein the incident side of the light extraction film is adhered onto any of the primary surfaces of the light guide plate through a first optical adhesive layer,
wherein a refractive index of the light incident side of the light extraction film is greater than a refractive index of the light guide plate,
wherein a difference between a refractive index of the first optical adhesive layer and the refractive index of the light guide plate is smaller than or equal to 0.1,
wherein the light incident side of the light extraction film comprises a plurality of transparent micro-convex structures configured to extract light from the light guide plate;
further wherein:
each of the micro-convex structures has a refractive index greater than or equal to that of the light guide plate; or
each of the micro-convex structures has a cross-sectional width which is increased with an increase of a distance from the light guide plate.

12. The backlight module according to claim 11, wherein the decoration layer and the light guide plate are adhered to each other through a second optical adhesive layer, and the second optical adhesive layer has a refractive index smaller than that of the light guide plate.

* * * * *